United States Patent [19]

Chen et al.

[11] Patent Number: 4,703,674

[45] Date of Patent: Nov. 3, 1987

[54] ELECTRICAL PLIER

[76] Inventors: Ching-Wen Chen; Ching-Jen Chen, both of No. 11, Lane 60, Mei Lin Street, Tai San Hsiang, Taipei Hsieng, Taiwan

[21] Appl. No.: 895,114

[22] Filed: Aug. 11, 1986

[51] Int. Cl.[4] .............................................. H02G 1/12

[52] U.S. Cl. ..................................................... 81/9.42

[58] Field of Search ........................ 81/9.4, 9.41, 9.42, 81/9.43

[56] References Cited

U.S. PATENT DOCUMENTS 2,179,581 11/1939 Voogd ................................ 81/9.42

3,226,815 1/1966 Kelly .................................. 81/9.41

FOREIGN PATENT DOCUMENTS 583502 12/1977 U.S.S.R. .............................. 81/9.41

*Primary Examiner*—Roscoe V. Parker

*Attorney, Agent, or Firm*—Townsend & Townsend

[57] ABSTRACT

An electrical pliers includes two posterior arms and two anterior arms overlapped and pivoted together, the posterior arms serving as handles and the anterior arms acting as jaw members. In the anterior arms are mounted wire stripping jaw members and wire clamping jaw members which extend transversely and partly out of the respective anterior arms. When the handles are depressed to approach one another, movable jaw members are moved to fixed jaw members in a direction parallel to a longitudinal axis of the pliers so as to clamp and cut the insulation layer of a wire, and then the anterior arms open to remove the cut portion of the insulation layer.

8 Claims, 6 Drawing Figures

ELECTRICAL PLIER

BACKGROUND OF THE INVENTION

This invention relates to an electrical pliers, particularly to a pliers that includes a pair of wire stripping jaw members and a pair of wire clamping jaw members mounted respectively in two anterior arms which act as a jaw and pivoted to two posterior arms which serve as handles. The jaw members extend transversely and partly out of the anterior arms, and movable jaw members move toward or away from fixed jaw members in a longitudinal direction relative to the longitudinal axis of the pliers.

It is known that electrical pliers are provided with means for cutting an insulation layer of a wire without cutting into the conductor inside the insulation layer. In one of the electrical pliers, a pair of wire stripping cutters are provided between a pair of clamping jaw members which has clamping jaw faces anterior to the stripping cutters. The stripping cutters can close and open to sever the wire, and the clamping jaw members can close and open to clamp the wire. In operation, the wire is inserted from the front side of the jaw members into between the clamping jaw faces and then to the stripping cutters. After severing the insulation layer of the wire, the stripping cutters move rearward from the clamping jaw faces and strip the insulation layer. Such an electrical wire is available for working only on a limited range of wire sizes.

SUMMARY OF THE INVENTION

An object of the invention is to provide a electrical pliers of novel construction that can be used for a wider range of wire sizes.

The invention provides an electrical pliers which comprises a pair of posterior arms each having an elongate rear portion to serve as a handle and a front planar portion, the front planar portions being pivoted to one another at a pivot point and each having a tapered portion, with a cam face, projecting forwardly at one side of the pivot point opposite the handles. The projecting tapered portions cooperatively act as a jaw when the handles are operated, and the cam faces converge forwardly when the tapered portions are in a closed position.

A pair of anterior arms are pivotally connected, with their rear portions, to the posterior arms at the pivot point and act cooperatively as a jaw when the handles are operated. Each anterior arm defines an accommodating space, and the tapered portions of the posterior arms extend respectively into the accommodating spaces.

There are a pair of wire stripping jaw members each having a first portion mounted in one of the anterior arms and a second portion extending transversely and partly out of the respective anterior arm. One of the wire stripping jaw members is fixed, and the other wire stripping jaw member is posterior to and movable toward and away from the fixed jaw member in a direction parallel to the longitudinal axis of the pliers. The first portion of the movable wire stripping jaw member has a slanted face engaged with one of the cam faces.

There are a pair of clamping jaw members having a first portion mounted in the other one of the anterior arms and a second portion extending transversely and partly out of from the respective anterior arm. One of the clamping jaw members is fixed, and the other clamping jaw member is posterior to and movable toward and away from the fixed clamping jaw member in a direction parallel to the longitudinal axis of the pliers. The first portion of the movable clamping jaw member has a slanted face engaged with the other cam face.

Two first spring members are connected respectively to the fixed wire stripping jaw member and the fixed clamping jaw member and bias the movable wire stripping jaw member and the movable clamping jaw member to an open position. A resilient plate is fixed to one of said anterior arms at one end thereof, the plate having an other end capable of engaging releaseably with the other anterior arm at a first point to keep the anterior arms in a closed position, and at a second point to maintain the anterior arm in an open position.

In one aspect of the invention, the pliers further includes a second spring member connected to the anterior arms for biasing the anterior arms to a normally closed position, and a third spring member attached to the pivot means and having two end portions attached to the handles to bias them away from one another and to maintain the tapered portion in a normally closed position. Preferably, the tapered portions of the posterior arms are offset from the planes defined respectively by the front planar portions so that the tapered portions lie in the same plane.

In another aspect of the invention, each anterior arm is arranged in the form of a narrow casing of U-shaped cross-section having two parallel walls and a connecting wall between the parallel walls, the walls being oriented perpendicularly with respect to the axis of the pivot means.

In still another aspect of the invention, the first portions of the movable wire stripping jaw member and the movable clamping jaw member are in slideable contact with the parallel walls and the connecting wall of the respective anterior arms, the slanted faces of the movable jaws members being in a slanted position relative to the connecting walls of the respective anterior arms, oriented in a direction corresponding to the inclination of the cam faces, and in contact with the cam faces.

DETAILED DESCRIPTION OF THE PREFERRED EMBODIMENT

Figure 1:
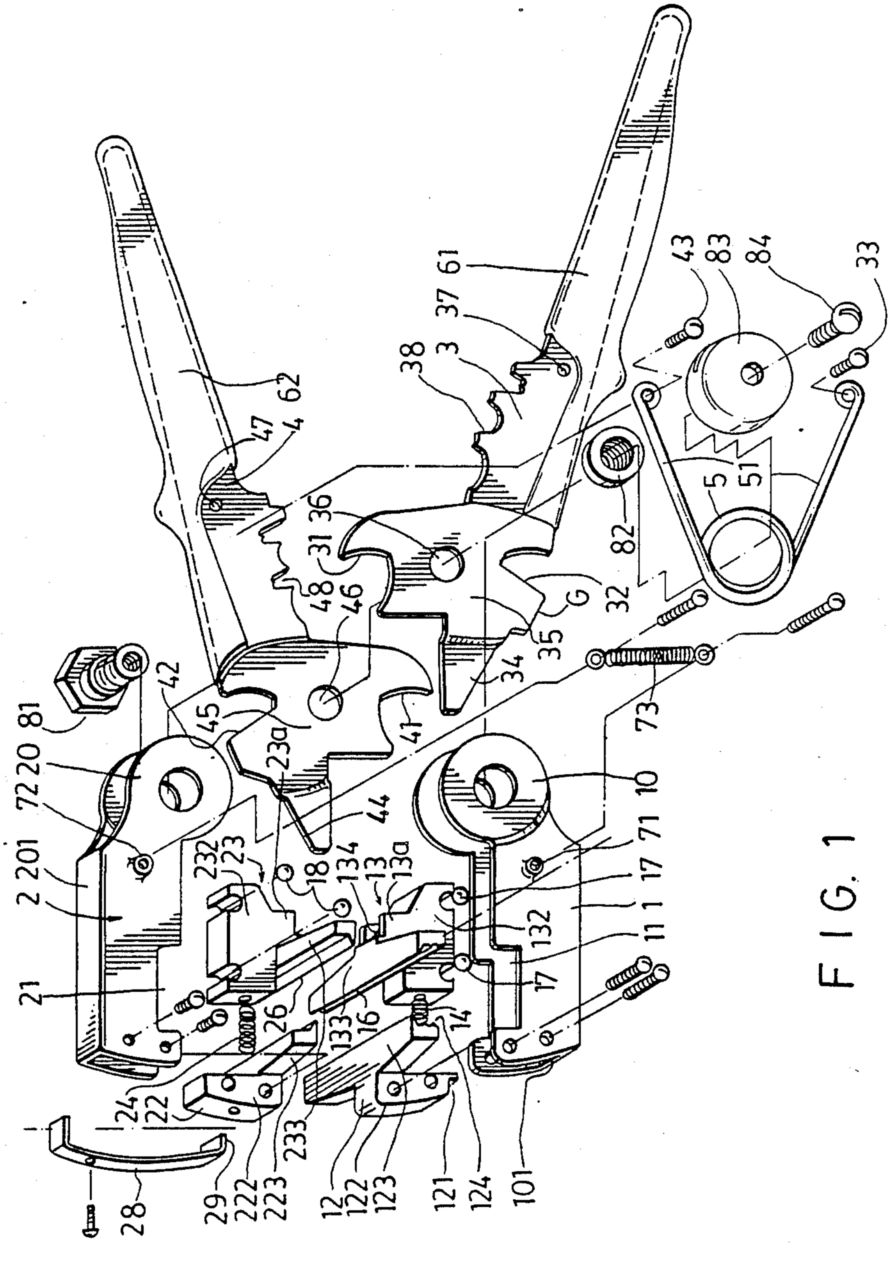
FIG. 1 is an exploded view of an electrical pliers constructed according to the present invention.
Figure 2:
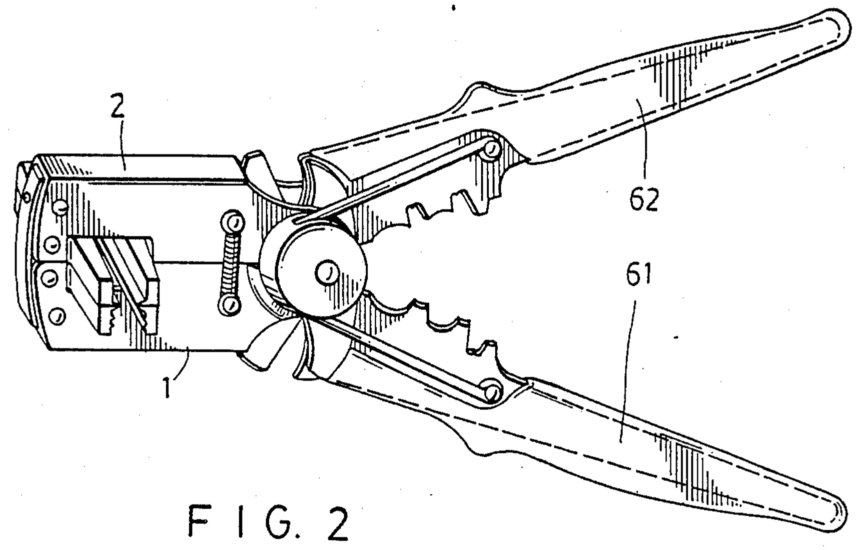
FIG. 2 is a perspective view of the pliers of FIG. 1.

Referring to the drawings, an electrical pliers is shown, including a pair of posterior arms 3 and 4 which have elongate rear portions 61 and 62 serving as handles and front planar portions 35 and 45 pivoted to one another with a pivot means passing through pivot holes 36 and 46. There are also two anterior arms 1 and 2 connected pivotally to the posterior arms 3 and 4 with the same pivot means.

Each anterior arm 1 or 2 is arranged in the form of a narrow casing of a U-shaped cross-section which has two parallel walls respectively formed with two rear lobes 10 or 20 for being pivoted to the posterior arms 3 and 4, and a transverse wall 101 or 201 interconnecting said parallel walls. The pivot means is constituted of a headed bolt 81 threaded through the pivot holes of the arms 1, 2, 3 and 4, and a nut 82, a cap 83 and a screw member 84 incorporated with the bolt 81.

A spring member 5 is disposed around the nut 82, and arms 51 of the spring member 5 are attached respectively to the handle 61 and 62 at points 37 and 47 by means of screws 33 and 43 so that the handles 61 and 62 are biased to move away from one another in a normal position. The front planar portions 35 and 45 of the arms 3 and 4 which are overlapped with the arms 1 and 2 have tapered portions 34 and 44 which project forwardly into the anterior arms 1 and 2 and act as a jaw when the handle 61 and 62 are operated. These tapered portions 34 and 44 are offset respectively from the plane defined by the front planar portion 35 and 45 so that they lie in the same plane. When the handles 61 and 62 are away from one another, the tapered portions 34 and 44 are placed in a closed position.

There are a pair of clamping jaws 12 and 13 mounted in the anterior arm 1. The clamping jaw 12 has a mounting body 122 fixed between the parallel walls of the arm 1 by means of screws and a jaw formation 123 extending transversely and partly outward at two sides of the anterior arm 1 through notches 11 provided in the parallel walls of the arm 1. The jaw formation 123 has a toothed clamping face 124 parallel with the axis of the pivot means. The clamping jaw 13 is movable and has a mounting body 132 placed in the anterior arm 1 posteriorly to the fixed clamping jaw 12 in a slideable position. The mounting body 132 is in slideable contact with the parallel walls and the connecting wall 101 of the anterior arm 1. In order to enhance the sliding capability of the mounting body 132 in the anterior arm 1, ball members 17 are provided in grooves of the mounting body 132 adjacent to the wall 101 of the arm 1. A compression spring 14 is affixed to the mounting bodies 122 and 132 to bias the mounting body 132 to move away from the body 122 in a direction parallel to the longitudinal axis of the pliers. Integrally formed with the movable mounting body 132 is a jaw formation 133 which extends transversely and partly outward at two sides of the anterior arm 1 and has a toothed clamping face 16 opposite to the clamping face 124.

A pair of wire stripping jaws 22 and 23 are mounted in the anterior arm 2. The jaw 22 has a mounting body 222 fixed between the parallel walls of the arm 2 by means of screws and a jaw formation 223 extending transversely and partly outward from two sides of the anterior arm 2 through notches 21 provided in the parallel walls of the arm 2. The jaw formation 223 has a jaw face with a cutting edge oriented in parallel with the axis of the pivot means. The jaw 23 is movable and has a mounting body 232 placed in the anterior arm 2 posteriorly to the fixed jaw 22 in a slideable position. The mounting body 232 overlaps the jaw formation 223 of the fixed jaw 22 and is in slideable contact with the parallel walls and the connecting wall 201 of the anterior arm 2. In order to increase the sliding capability of the mounting body 232 in the anterior arm 2, ball members 18 are provided in grooves of the mounting body 232 adjacent to the wall 201 of the arm 2. A compression spring 24 is affixed to the mounting bodies 222 and 232 to bias the mounting body 232 to move away from the body 222. Integrally formed with the movable mounting body 232 is a jaw formation 233 which extends transversely and partly outward from two sides of the anterior arm 2 and has a jaw face with a cutting edge 26 opposite to the jaw face of the fixed jaw 22.

Movable wire stripping jaw 23 and movable clamping jaw 13 have respectively slanted faces 234 and 134 and two opposed flanks 23*a* and 13*a*. The slanted faces 234 and 134 are slanted respectively relative to the connecting walls 201 and 101. The tapered portions 34 and 44 of the arms 3 and 4 extend between the slanted faces 134 and 234 of the movable jaws 13 and 23. Contacting the slanted faces 134 and 234 are cam faces 341 and 441 of the tapered portions 34 and 44 which converge forwards when the tapered portions 34 and 44 are in the closed position. The tapered portions 34 and 44 of the arms 3 and 4 act on the movable jaws 13 and 23 to cause them to contact with the walls 101 and 201 of the arms 1 and 2. The jaw formations 123 and 223 which overlap with the the movable jaws 13 and 23 also serve to hold the movable jaws 13 and 23 not to release from the arms 1 and 2. When the handles 61 and 62 are depressed against the action of the spring 5, the tapered portions 34 and 44 will cam the jaws 13 and 23 to move them against the action of the springs 14 and 24 until the jaws 13 and 23 are immovable. upon continued depression of the handles 61 and 62, the arms 1 and 2 are caused to open.

A tension spring 73 is attached to two protrusions 71 and 72 of the arms 1 and 2 with its two ends for maintaining the arms 1 and 2 in a normally closed position. At the foremost end of the arm 2 is a resilient plate 28 which is secured to the fixed jaw 22 and extends over the fixed jaw 12. A curved end 29 of the resilient plate 28 is engaged in a recess 121 of the fixed jaw 12 so as to hold the arms 1 and 2 together or to prevent temporarily the arms 1 and 2 from opening during the initial stage of depressing the handles 61 and 62.

Figure 3:
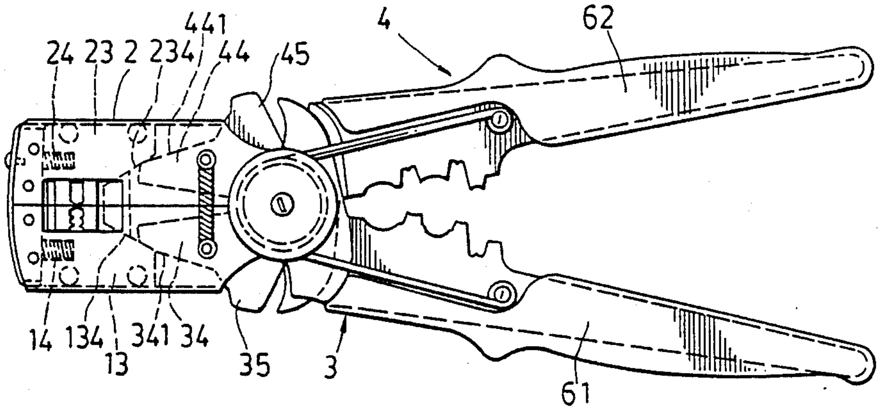
FIG. 3 is a side elevation view of the pliers of FIG. 1 in a clamping and cutting position.
Figure 4:
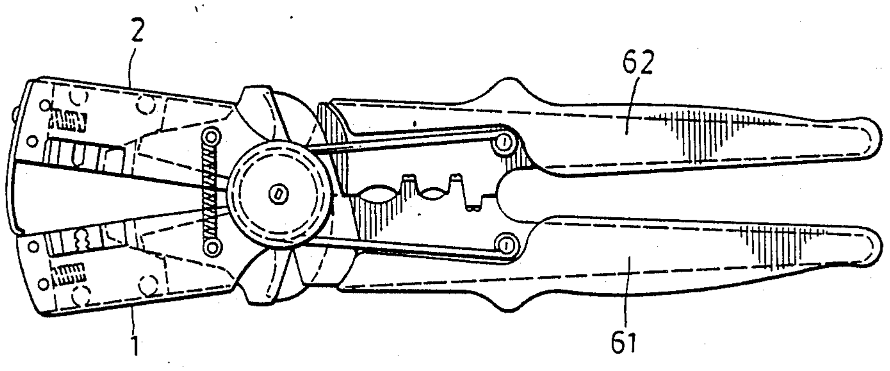
FIG. 4 is a side elevation view of the pliers of FIG. 1 in a stripping position.
Figure 5:
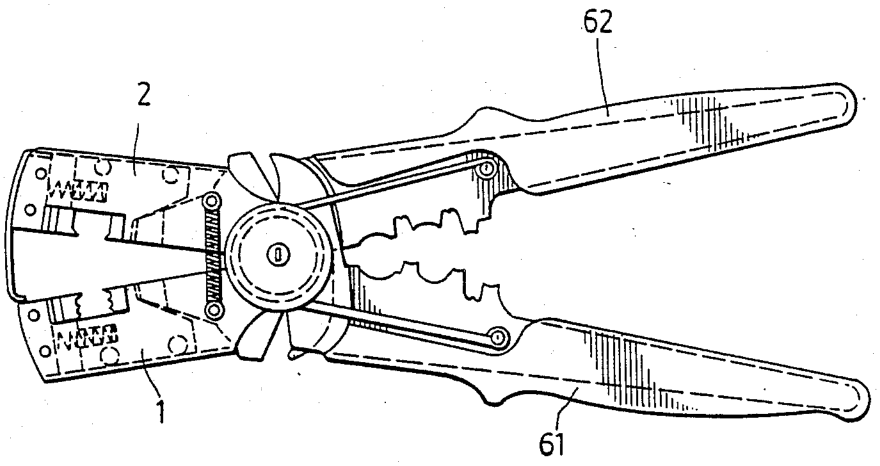
FIG. 5 is a side elevation view of the pliers of FIG. 1 in a position in which the stripped wire can be released from the jaw members.
Figure 6:
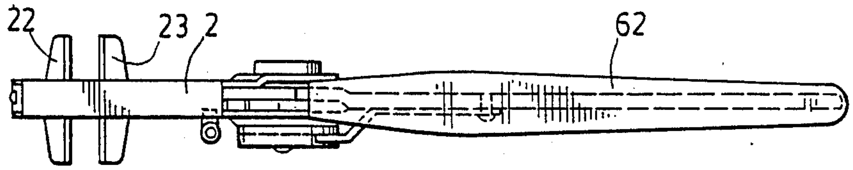
FIG. 6 is a plan view of the pliers of FIG. 1.

As optional features, the arms 3 and 4 are provided with wire cutters which are defined by opposed cutting notched edges 31, 32, 41 and 42 formed in the front planar portions 35 and 45. Additionally, there are wire-terminal joining members which are defined by opposed series of notches 38 and 49 respectively formed in the arms 3 and 4 at portions between the handles 61 and 62 and the front planar portions 35 and 45. In operation, the handles 61 and 62 are depressed against the action of the spring 5 so as to open the tapered portions 34 and 44. The resilient plate 28 is so designed that its curved end 29 can disengage from the recess 121 of the fixed jaw 12 only after the springs 14 and 24 are completely compressed. Therefore, at the initial stage of depressing the handles 61 and 62, the tapered portions 34 and 44 cam the movable jaw members 13 and 23 to move only against the action of the springs 14 and 24. When a wire is put between the fixed jaws 12 and 22 and the movable jaws 13 and 23, the wire is clamped between the jaw members 12 and 13 and the insulation layer of the wire is cut by the jaws 22 and 23 without the conductors there inside being cut (FIG. 3). In this situation, the movable jaws 13 and 23 are held rigidly against the fixed jaws 12 and 22 respectively. Upon continued depression of the handles, the arms 1 and 2 are opened against the action of the resilient plate 28 (FIG. 4), causing the wire stripping jaw members 22 and 23 to move away from the clamping jaw members 12 and 13 and thereby removing a portion of the cut insulation layer from the wire. When the handles are released, the movable jaws 13 and 23 will move rearward before the arms 1 and 2 are closed since the resilient plate 28 engages with the fixed jaw 12 at the point opposite to the fixed jaw 22 (FIG. 5), this enabling the wire to be released from the jaw members before the arms 1 and 2 are closed. Protrusions G are provided at the front planar portion 35 and 45 which will act on one another to cause the arms 1, 2, 3 and 4 to return completely to their original non-operative position when the handle are released.

Since the jaw members 12, 12, 22, and 23 extend outward at two sides of the anterior arms 1 and 2, a wire can be inserted between the jaws at either side of the anterior arms.

With the invention thus explained, it is apparent that various modifications and variations can be made without departing from the scope of the invention. It is therefore intended that the invention be limited as indicated in the appended claims.

What I claim is:

1. A pliers comprising:

a pair of posterior arms each having an elongate rear portion to serve as a handle and a front planar portion, said front planar portions being pivoted to one another at a pivot point and each having a tapered portion, with a cam face, projecting forwardly at one side of said pivot point opposite said handles, said projecting tapered portions cooperatively acting as a jaw when said handles are operated, and said cam faces being converged forwardly when said tapered portions are in a closed position;

a pair of anterior arms having their rear ends pivotally connected to said posterior arms at said pivot point and acting cooperatively as a jaw when said handles are operated, each of said anterior arms defining an accommodating space, said tapered portions of said posterior arms extending respectively into said accommodating space;

a pair of wire stripping jaw members, each having a first portion mounted in one of said anterior arms and a second portion extending transversely and partly out of said one anterior arm, one of said wire stripping jaw members being fixed, and the other said wire stripping jaw member being posterior to and movable toward and away from said fixed jaw member in a direction parallel to the longitudinal axis of the pliers, said first portion of said movable wire stripping jaw member having a slanted face engaged with one of said cam faces;

a pair of clamping jaw members having a first portion mounted in the other one of said anterior arms and a second portion extending transversely and partly out of said one anterior arm, one of said clamping jaw members being fixed, and the other said clamping jaw member being posterior to and movable toward and away from said fixed clamping jaw member in a direction parallel to the longitudinal axis of the pliers, said first portion of said movable clamping jaw member having a slanted face engaged with the other said cam face;

two first spring members connected respectively to said fixed wire stripping jaw member and said fixed clamping jaw member and biasing said movable wire stripping jaw member and said movable clamping jaw member to an open position; and a resilient plate having one end fixed to one of said anterior arms and the other end capable of engaging releaseably with the other said anterior arm at a first point to keep said anterior arms in a closed position, and at a second point to maintain said anterior arms in an open position.

2. A pliers as claimed in claim 1, further comprising a second spring member connected to said anterior arms for biasing said anterior arms to a normally closed position.

3. A pliers as claimed in claim 1, further comprising a third spring member having two end portions attached to said handles to bias them away from one another and to maintain said tapered portion in a normally closed position.

4. A pliers as claimed in claim 1, wherein said tapered portions are offset from the planes defined by respective said front planar portions so that said tapered portions lie in the same plane.

5. A pliers as claimed in claim 1, wherein said each anterior arm is arranged in the form of a narrow casing of U-shaped cross-section having two parallel walls and a connecting wall between said parallel walls, said walls being oriented perpendicularly with respect to the axis of said pivot means.

6. A pliers as claimed in claim 5, wherein said first portions of said movable wire stripping jaw member and said movable clamping jaw member are in slideable contact with said parallel walls and said connecting wall of respective said anterior arms, said slanted faces of said movable jaws members being in a slanted position relative to said connecting walls of respective said anterior arms, oriented in a direction corresponding to the inclination of said cam faces, and in contact with said cam faces.

7. A pliers as claimed in claim 1, wherein said front planar portions of said posterior arms include opposed cutting notches formed respectively therein to serve as wire cutting members.

8. A pliers as claimed in claim 1, wherein said posterior arms include a series of opposed notches formed at a portions between said handles and said front planar portions to serve as wire-terminal joining members.

* * * * *